US009574051B2

(12) United States Patent
Hedrick et al.

(10) Patent No.: US 9,574,051 B2
(45) Date of Patent: Feb. 21, 2017

(54) SURFACE-DECORATED POLYMERIC AMPHIPHILE POROGENS FOR THE TEMPLATION OF A NANOPOROUS MATERIALS

(75) Inventors: James Lupton Hedrick, Pleasanton, CA (US); Victor Yee-Way Lee, San Jose, CA (US); Teddie Peregrino Magbitang, San Jose, CA (US); Robert Dennis Miller, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 12/770,529

(22) Filed: Apr. 29, 2010

(65) Prior Publication Data

US 2010/0273295 A1 Oct. 28, 2010

Related U.S. Application Data

(62) Division of application No. 11/119,306, filed on Apr. 28, 2005, now Pat. No. 7,723,438.

(51) Int. Cl.
| C04B 38/00 | (2006.01) |
| C08F 12/08 | (2006.01) |
| C08F 265/04 | (2006.01) |
| H01L 21/50 | (2006.01) |
| C08G 83/00 | (2006.01) |

(52) U.S. Cl.
CPC .................. *C08G 83/003* (2013.01)

(58) Field of Classification Search
USPC .............. 525/50, 85, 242, 308, 309, 901, 63,525/333.7, 383, 419, 438, 474, 479; 521/61, 50, 521/52, 99, 63, 77, 154; 252/519.33; 257/750, 257/758, E21.499; 438/113; 428/447, 448, 428/304.4, 620
See application file for complete search history.

(56) References Cited

U.S. PATENT DOCUMENTS

| 4,938,885 | A | | 7/1990 | Migdal |
| 5,128,737 | A | * | 7/1992 | van der Have ............... 257/503 |
| 5,154,853 | A | * | 10/1992 | Newkome et al. ............ 516/56 |
| 5,275,838 | A | | 1/1994 | Merrill |
| 5,773,521 | A | | 6/1998 | Hoxmeier et al. |
| 5,830,986 | A | | 11/1998 | Merrill et al. |
| 5,922,810 | A | | 7/1999 | Schwindeman et al. |
| 6,043,336 | A | | 3/2000 | Miller et al. |
| 6,077,500 | A | | 6/2000 | Dvornic et al. |
| 6,093,636 | A | | 7/2000 | Carter et al. |
| 6,184,313 | B1 | | 2/2001 | Roovers et al. |
| 6,258,896 | B1 | | 7/2001 | Abuelyaman et al. |
| 6,271,273 | B1 | | 8/2001 | You et al. |
| 6,277,766 | B1 | | 8/2001 | Ayers |
| 6,288,197 | B1 | | 9/2001 | Youngs et al. |
| 6,328,988 | B1 | | 12/2001 | Uhrich |
| 6,365,146 | B1 | | 4/2002 | Uhrich |
| 6,391,932 | B1 | | 5/2002 | Gore et al. |
| 6,399,666 | B1 | | 6/2002 | Hawker et al. |
| 6,414,084 | B1 | | 7/2002 | Adedeji |
| 6,420,441 | B1 | | 7/2002 | Allen |
| 6,444,758 | B2 | | 9/2002 | McNamara et al. |
| 6,576,767 | B1 | | 6/2003 | Gottschall |
| 6,602,804 | B2 | | 8/2003 | Allen et al. |
| 6,617,397 | B2 | | 9/2003 | McNamara et al. |
| 6,630,520 | B1 | | 10/2003 | Bruza et al. |
| 6,632,889 | B1 | | 10/2003 | Yin et al. |
| 6,653,358 | B2 | | 11/2003 | Bruza et al. |
| 6,664,315 | B2 | | 12/2003 | Tomalia et al. |
| 6,670,285 | B2 | | 12/2003 | Hawker et al. |
| 6,699,499 | B1 | | 3/2004 | Aneja |
| 6,867,255 | B2 | | 3/2005 | Robello et al. |
| 7,109,247 | B2 | | 9/2006 | Baran et al. |
| 7,265,186 | B2 | | 9/2007 | Zhao |

(Continued)

FOREIGN PATENT DOCUMENTS

WO     WO 00/31183     6/2000

OTHER PUBLICATIONS

Liu, M. et al Journal of Controlled Release vol. 65 (2000) pp. 121-131.*
Gillies et al Journal of the American Chemical Society vol. 124 (2002) pp. 14137-14146.*
Chen et al Journal of the American Chemical Society vol. 126, pp. 2662-2663 published Mar. 10, 2004.*
International Union for Pure and Applied Chemistry definition of "Star macromolecule" available online at http://goldbook.iupac.org/S05935.html on Dec. 12, 2012.*

(Continued)

*Primary Examiner* — Irina S Zemel
*Assistant Examiner* — Jeffrey Lenihan
(74) *Attorney, Agent, or Firm* — Karen Canaan; CanaanLaw, P.C.

(57) ABSTRACT

A nanoparticle which includes a multi-armed core and surface decoration which is attached to the core is prepared. A multi-armed core is provided by any of a number of possible routes, exemplary preferred routes being living anionic polymerization that is initiated by a reactive, functionalized anionic initiator and ∈-caprolactone polymerization of a bis-MPA dendrimer. The multi-armed core is preferably functionalized on some or all arms. A coupling reaction is then employed to bond surface decoration to one or more arms of the multi-armed core. The surface decoration is a small molecule or oligomer with a degree of polymerization less than 50, a preferred decoration being a PEG oligomer with degree of polymerization between 2 and 24. The nanoparticles (particle size ≤10 nm) are employed as sacrificial templating porogens to form porous dielectrics. The porogens are mixed with matrix precursors (e.g., methyl silsesquioxane resin), the matrix vitrifies, and the porogens are removed via burnout. Greater porosity reduces the dielectric constant k of the resulting dielectrics. The porous dielectrics are incorporated into integrated circuits as lower k alternatives to silicon dioxide.

19 Claims, 12 Drawing Sheets

(56) References Cited

U.S. PATENT DOCUMENTS

| | | | |
|---|---|---|---|
| 2002/0002242 A1 | 1/2002 | McNamara et al. | |
| 2002/0045714 A1 | 4/2002 | Tomalia et al. | |
| 2002/0120096 A1* | 8/2002 | Tsuchida et al. | 528/332 |
| 2002/0123609 A1 | 9/2002 | Frechet et al. | |
| 2002/0128234 A1 | 9/2002 | Hubbell et al. | |
| 2002/0151655 A1 | 10/2002 | McNamara et al. | |
| 2003/0022216 A1 | 1/2003 | Mao et al. | |
| 2003/0050433 A1 | 3/2003 | Agarwal et al. | |
| 2003/0165625 A1 | 9/2003 | So et al. | |
| 2003/0207595 A1 | 11/2003 | Ralamasu et al. | |
| 2004/0070094 A1 | 4/2004 | Tomalia et al. | |
| 2004/0086479 A1 | 5/2004 | Grinstaff et al. | |
| 2004/0130027 A1 | 7/2004 | Chen et al. | |
| 2004/0137241 A1 | 7/2004 | Lin et al. | |
| 2004/0137734 A1 | 7/2004 | Chou et al. | |
| 2006/0063859 A1* | 3/2006 | Guan | 523/201 |

OTHER PUBLICATIONS

International Union for Pure and Applied Chemistry definition of "Star polymer" available online at http://goldbook.iupac.org/S05936.html on 12/12/201.*

Angot et al., "Atom transfer radical polymerization of styrene using a novel octafunctional initiator: synthesis of well-defined polystyrene stars," Macromolecules (1998) 31:7218-7225.

Antonietti et al., "Microgels—Polymers with a special molecular architecture," Angew. Chem. Intl. Ed. (1998) 27:1743-1754.

Bates, "Polymer-polymer phase behavior," Science (1991) 251:898-905.

Brinker et al., "Evaporation-induced self assembly made easy," Adv. Mater. (1999) 11:579-585.

Bruinsma et al., "Low K mesoporous silica films through template-based processing," Proc. Mater. Res. Soc. (1997) 443:105.

Connor et al., "Templating of silsesquioxane cross-linking using unimolecular self-organizing polymers," Angew. Chem. Intl. Ed. (2003) 42:3785-3788.

Francis et al., "Synthesis and Surface Properties of Amphiphilic Star-Shaped and Dendrimer-Like Copolymers Based on Polystyrene Core and Poly(ethylene oxide) Corona," Macromolecules (2003) 36:8253-8259.

Hedrick et al., "Application of complex macromolecular architectures for advanced microelectronic materials," Chem. Eur. J. (2002) 8:3308-3319.

Hedrick et al., "Dendrimer-like star block and amphiphilic copolymers by combination of ring-opening and atom transfer radical polymerization," Macromolecules (1998) 31:8691-8705.

Hedrick et al., "Templating Nanoporosity in Thin-Film Dielectric Insulators," Adv. Mater. (1998), 10:1-5.

Heise et al., "Starlike Polymeric Architectures by Atom-Transfer Radical Polymerization: Templates for the Production of Low Dielectric Constant Thin Films," Macromolecules (2000) 33:2346-2354.

Ishizu et al. "Novel synthesis and characterization of hyperbranced polymers," Polymer, vol. 41, (2000), pp. 6081-6086.

Klaerner et al., "Colorfast blue light-emitting random copolymers derived from di-n-hexylfluorene and anthracene," Adv. Mater. (1998) 10:993.

Mecerreyes et al., "A Novel Approach to Functionalized Nanoparticles: Self- Crosslinking of Macromolecules in Ultradilute Solution," Adv. Mater. (2001) 13(3):204.

Miller et al., "Nanoporous, low-dielectric constant organosilicate materials derived from inorganic polymer blends," Chap. 11, ACS Symposium Series, Polymers for Microelectronics and Nanoelectronics, Lin, et al., eds., pp. 144-160, 2004.

Nierengarten et al., "Amphiphilic Diblock Dendrimers: Synthesis and Incorporation in Langmuir and Langmuir-Blodgett Films," J. Am. Chem. Soc. (2001) 123:9743-9748.

Nyce et al., "In Situ Generation of Carbenes: A General and Versatile Platform for Organocatalytic Living Polymerization," J. Am. Chem. Soc. (2003) 125:3046-3056.

Patton et al., "Atom transfer radical polymerization and the synthesis of polymeric materials," Adv. Mater. (1998) 10:901-915.

Percec et al., "Universal Iterative Strategy for the Divergent Synthesis of Dendritic Macromolecules from Conventional Monomers by a Combination of Living Radical Polymerization and Irreversible TERminator Multifunctional INItiator (TERMINI)," J. Am. Chem. Soc. (2003) 125:6503-5616.

Trollsås et al., "Dendrimer-like Star Polymers," J. Am. Chem. Soc. (1998)120:4644-4651.

Ueda et al., "Calixarene—core multifunctional initiators for the ruthenium-mediated living radical polymerization of methacrylates," Macromolecules (1998) 31:6762-6768.

Volksen et al., "Porous organosilicates for on-chip applications: dielectric generational extendibility by the introduction of porosity," Chap 6, Low Dielectric Constant Materials for IC Applications, Ho et al., eds., Springer-Verlag, pp. 167-202, 2003.

Weener et al., "Some Unique Properties of Dendrimers Based upon Self-Assembly and Host-Guest Properties," In J.M.J. Fréchet & D.A. Tomalia eds., Dendrimers and other Dendritic Polymers (Wiley 2001).

Yim et al., "The preparation and characterization of small mesopores in siloxane-based materials that use cyclodextrins as templates," Adv. Funct. Mater. (2003) 13:382-386.

Zhao et al., "Triblock copolymer synthesis of mesoporous silica with periodic 50 to 300 angstrom pores," Science (1998) 279:548-552.

Zhao et al., "Continuous mesoporous silica thin films with highly ordered large pore structures," Adv. Mater. (1998) 10:1380-1385.

\* cited by examiner

FE-SEM

TEM

FE-SEM

TEM

SURFACE-DECORATED POLYMERIC AMPHIPHILE POROGENS FOR THE TEMPLATION OF A NANOPOROUS MATERIALS

CROSS-REFERENCE TO RELATED APPLICATIONS

This application claims priority to U.S. patent application Ser. No. 11/119,306, filed Apr. 28, 2005, the contents of which is incorporated by reference herein in its entirety.

TECHNICAL FIELD

This invention relates generally to the fields of polymer chemistry and nanotechnology. More specifically, it relates to polymeric porogens which can serve as templates for the formation of porous materials.

BACKGROUND

There is considerable interest in materials with low dielectric constants for use in integrated circuit manufacturing. Integrated circuits consist primarily of transistors and other devices interconnected by wires. The wires are separated from other wires and from the integrated circuit substrate by dielectric films which must be deposited onto the integrated circuit during its manufacturing process. The common dielectric material used in integrated circuits was for decades silicon dioxide, whose dielectric constant k lies between 3.9 and 4.2. Generally speaking the capacitance of wires to ground and to other wires in an integrated circuit will be proportional to the dielectric constant of the dielectric material which separates them. The time for a signal to propagate over a wire in an integrated circuit is related to the product RC, R being the resistance of the wire and C its capacitance to ground. Thus, a reduction of the dielectric constant, leading to a reduction in C, would speed signal propagation and so would tend to make integrated circuits faster. A reduction in dielectric constant would also reduce the power required for signal propagation, which is also approximately proportional to C. Because of this, it is desirable to manufacture integrated circuits which use a dielectric with a significantly lower dielectric constant than silicon dioxide.

To achieve a modest improvement in dielectric constant, silicon dioxide has been replaced in some cases by fluorinated silicon dioxide, resulting in k=3.6-3.8. Lower k alternatives are planned for the 90 nm generation of integrated circuit processes. The dielectric in many such processes will be a carbon-doped oxide (CDO) deposited by CVD deposition of silicon-containing precursors. Carbon-doped oxides will deliver dielectric constants ranging from 2.9-3.1 depending on the precursor and process.

Among the techniques which have been studied for obtaining materials with a lower dielectric constant for use in integrated circuit fabrication is the formation of porous materials. The pores are filled with air and thus reduce the dielectric constant of the overall material, given that the dielectric constant of air is about 1.01.

Generally speaking, porosity in a thin film can be introduced by a variety of means, for example by introducing free volume, by packing shape persistent objects, by using porous matrix particles, or by the introduction of sacrificial pore generators (porogens).

Porogen materials which have been studied include isolated small molecules (cyclodextrins, calixarenes), self-assembled supramolecular structures (e.g., surfactants forming micelles), or polymeric materials. See in this regard W. Volksen et al., "Porous Organosilicates for On-Chip Applications: Dielectric Generational Extendibity by the Introduction of Porosity," in *Low Dielectric Constant Materials for IC Applications*, P. S. Ho, J. Leu, W. W. Lee eds., chapter 6 (Springer-Verlag 2002); J. L. Hedrick et al., *Adv. Mater.* 1998, 10(13), 993; J. L. Hedrick et al., *Chem. Eur. J.* 2002, 8(15), 3309; J.-H. Yim et al., *Adv. Funct. Mater.* 2003, 13, 382 (discussing cyclodextrins); P. J. Bruinsma et al., *Proc. Mater. Res. Soc.* 1997, 443, 105; C. J. Brinker et al., *Adv. Mater.* 1999, 11(7), 579; D. Zhao et al., *Science* 1998, 279, 548; D. Zhao et al., *Adv. Mater.* 1998, 10(16), 1380.

Porogens would generally be used in the following manner. Precursors to a suitable dielectric matrix would be mixed in particular proportions with the porogen. The matrix precursors would then be processed to form the matrix, commonly undergoing some sort of vitrification. Once the matrix is formed, the porogens would be eliminated, typically by heating (burnout), leaving voids. Matrices for the manufacture of dielectrics can be, for example, inorganic thermosets, silsesquioxanes, organic silicas, or organic thermosetting resins, such as SiLK (Dow Chemical Company).

Polymeric materials can give rise to pores in a matrix in at least two ways. One way involves nucleation and growth (N&G) with kinetically arrested domain formation. For this route, the polymer must be initially miscible in the matrix polymer but becomes immiscible during the vitrification of the matrix resin, resulting in the formation of small domains of isolated pore-generating polymer. With appropriate processing, the growth of these nanodomains is arrested by the vitrifying matrix and pore sizes remain small when the polymer is removed via burnout. Porogens in an N&G approach can be simple linear homo and block copolymers if the incorporated functionality interacts strongly with that of the resin precursor. Where there is a weaker interaction, the porogens are preferably multi-armed stars to improve resin compatibility. The ultimate size of the pores depends on porogen structure, molecular weight and loading level, the nature of the matrix resin prepolymer, and the processing conditions. In general, the number of variables in play makes N&G procedures difficult to control.

A second approach to the formation of pores utilizes templating porogens to direct the vitrification of the matrix around the porogen. Templating porogens often lead to more regular structures and are, in general, simpler to control.

A type of templating process which has been studied involves dynamic self-assembly of the porogen into regular structures within the matrix which template the vitrification of organosilicate monomers. An example of this type of process would be the formation of mesoporous silica formed using monomeric or polymeric surfactants.

Alternately, vitrification may be templated with polymers which are either true nanoparticles because they are crosslinked, or which show particle-like behavior. In these cases, the particles are not strictly speaking miscible with the matrix resin, but they are compatibilized with that resin in order to prevent them from experiencing macroscopic aggregation. Crosslinked particles produced by microemulsion polymerization constitute examples of this approach which have been experimented on in both organosilicates and organic polymers. See in this regard M. Antonietti et al., *Angew. Chem. Int. Ed.* 1998, 27, 1743; D. Mecerreyes et al., *Adv. Mater.* 2001, 13(3), 204; U.S. Pat. No. 6,391,932 to R. H. Gore et al.; U.S. Pat. No. 6,420,441 to C. S. Allen; U.S. Pat. No. 6,271,273 to Y. You et al.; WO 00/31183 to K. J. Bruza et al.; U.S. Pat. No. 6,653,358 to K. J. Bruza et al.

When employing crosslinked particles as templates, judicious control of the functionality by controlling the sequence of monomer addition and reaction conditions is employed in order to produce adequately small particles with functionality which is compatible with the matrix material. Highly crosslinked particles often have a significant char yield which effects the intrinsic efficiency of pore generation.

Materials which are not highly crosslinked may exhibit particle-like behavior and be suitable as porogens. In particular, soft colloids can also display particle-like behavior in polymeric matrices without the need for extensive crosslinking. See in this regard E. F. Connor et al., *Angew. Chem. Int. Ed.* 2003, 42(32), 3785; R. D. Miller et al. in *Polymers for Microelectronics and Nanoelectronics*, Q. Lin, R. A. Pearson, J. C. Hedrick eds. (ACS Symposium Ser. No. 874, American Chemical Soc. 2004). It is a feature of this approach that a single porogen particle results in a single pore, so there is no need to achieve control of aggregation or precipitation dynamics of porogen particles. In this approach it is important that the porogens remain dispersed during matrix formation and do not aggregate.

In this approach, particles used as porogens are preferably unimolecular polymeric amphiphiles with a core which is highly incompatible with the matrix resin through the whole vitrification process and an outer corona which is compatible with that resin. With an amphiphile of this type, even though the core collapses into a dense ball, the amphiphilic particles may tend to remain dispersed because of the interaction of the corona with the matrix resin. In this situation, the ultimate size of the pore could either be that of the collapsed core alone, if the corona stays miscible throughout vitrification, or that of the entire particle assuming that the corona also collapses and becomes immiscible as the matrix vitrifies. U.S. Pat. No. 6,399,666 describes the use of certain unimolecular polymeric amphiphiles as porogens in organosilicate matrix materials.

The amphiphilic particles of U.S. Pat. No. 6,399,666 were produced using tandem polymerization procedures. Other references relevant to successive tandem polymerization include R. D. Miller et al. in *Polymers for Microelectronics and Nanoelectronics*, Q. Lin, R. A. Pearson, J. C. Hedrick eds. (ACS Symposium Ser. No. 874, American Chemical Soc. 2004); J. L. Hedrick et al., *Macromolecules* 1998, 31, 8691; S. Angot et al., *Macromolecules* 1998, 31, 7218; and J. Ueda et al., *Macromolecules* 1998, 31, 6762.

There are some drawbacks to the use of tandem polymerization techniques to produce amphiphilic porogens. First, to make tandem polymerization highly efficient one should achieve good control of molecular weights and polydispersities for two consecutive polymerizations. This is potentially difficult to achieve. Such control is particularly needed where the intent is to use the resulting particles in a templating process where one particle produces one pore and the porosity size distribution mirrors the molecular weight distribution of the particles. Second, the latent initiator sites for the second polymerization must be carried unchanged through the first polymerization and must remain available for transformation into the active initiator for the second polymerization. Typically, some of these sites are lost during the first polymerization and are therefore unavailable for the second. Third, the scale up of any process involving two consecutive polymerizations is difficult because it requires two yield-reducing polymer purification steps to separate the desired product from homopolymer and other contaminants. When carried out on a large scale, this may require multiple solvent precipitations from large volumes of solvent. Fourth, successive tandem polymerization is most appropriate for applications that require particle sizes in the 25-75 nm range. Difficulty is experienced in achieving lower particle sizes, perhaps on account of the difficulty of controlling a polymerization to generate many arms, each with very low degrees of polymerization, particularly when using core-out procedures. In addition, it is common to use atom transfer radical polymerization procedures (ATRP) to produce the corona using polar monomers such as substituted acrylates and methacrylates. (For background on the use of ATRP see T. E. Patton et al., *Adv. Mater.* 1998, 10(12), 901.) Although polar coronas can be produced with ATRP, this polarity is introduced by the monomer side chains (PEG, hydroxyethyl, etc.) while the backbone remains relatively hydrophobic, diluting the effect of the polar side chain. The result is that the degree of polymerization of each arm in the corona must be increased make the strongly hydrophobic core compatible in polar matrix media.

For these reasons, there is a need for alternative synthetic routes for producing unimolecular porogens which overcome the drawbacks of tandem polymerization and other available techniques.

SUMMARY OF THE INVENTION

In one aspect of the invention, there is a method of preparing a nanoparticle which includes a multi-armed core and surface decoration which is attached to the core. In this method, a multi-armed core is provided by any of a number of possible routes, some of which are listed in the detailed description of the invention. A coupling reaction is then employed to bond surface decoration to one or more arms of the multi-armed core. The surface decoration is a small molecule or an oligomer with a degree of polymerization less than 50.

In a different aspect of the invention, a unimolecular amphiphilic nanoparticle is provided, where the particle has a multi-armed core having at least three arms and has surface decoration attached to the core which is miscible in a matrix material.

In another aspect of the invention, there is provided a unimolecular amphiphilic nanoparticle which has a multi-armed core, which has surface decoration attached to the core which is miscible in a matrix material, where the surface decoration comprises small molecules and oligomers having a degree of polymerization of less than 20.

In another aspect of the invention, there is provided a method of forming a dielectric using surface-decorated unimolecular amphiphilic nanoparticles. The dielectric has a dielectric constant less than 3.0, preferably less than 2.5, and still more preferably less than 2.0. In the method of the invention, a quantity of surface-decorated unimolecular amphiphilic nanoparticles are mixed with a matrix forming substance or a precursor thereof, the mix is then processed as to form a dielectric matrix; and the nanoparticles are removed, for example through burnout.

In a further aspect of the invention, there is provided a method of producing an integrated circuit. Transistors and optionally other devices are formed on a semiconductor substrate, one or more dielectric layers are formed through a templating process which employs surface-decorated amphiphilic nanoparticles, interconnect is formed for interconnecting said transistors, the silicon substrate is diced, and the resulting dies are then packaged.

DETAILED DESCRIPTION OF THE INVENTION

Figure 1:
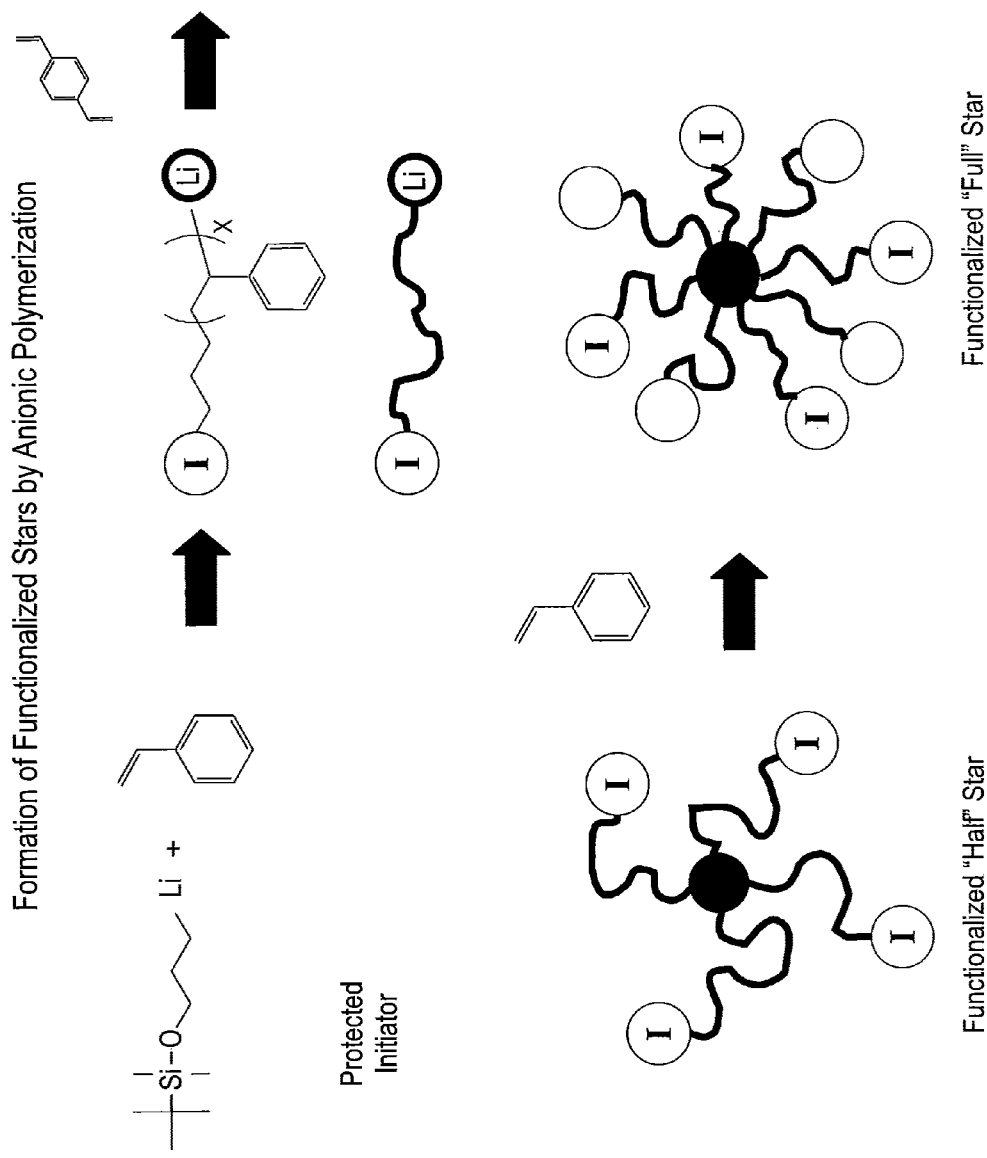
FIG. 1 depicts a route for the formation of functionalized multi-armed cores, referred to as "half stars" and "full stars," by anionic polymerization.

Unless otherwise indicated, this invention is not limited to specific compositions, components, or process steps. It should also be noted that the singular forms "a" and "the" are intended to encompass plural referents, unless the context clearly dictates otherwise. The terminology used herein is for the purpose of describing particular embodiments only and is not intended to be limiting.

In this specification and in the claims that follow, reference will be made to a number of terms, which shall be defined to have the following meanings:

As used herein, the phrase "having the formula" or "having the structure" is not intended to be limiting and is used in the same way that the term "comprising" is commonly used.

The term "polymer" is used to refer to a chemical compound that comprises linked monomers, and that may be linear, branched, or crosslinked. The term also encompasses not only homopolymers, but also copolymers, terpolymers, and the like. The term "copolymer," unless specifically indicated otherwise, refers to a polymer containing at least two different monomer units.

When a functional group is termed "protected," this means that the group is in modified form to preclude undesired side reactions at the protected site. Suitable protecting groups for the compounds of the present invention will be recognized from the present application taking into account the level of skill in the art, and with reference to standard textbooks, such as Greene et al., *Protective Groups in Organic Synthesis* (New York: Wiley, 1991).

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The invention in general terms includes a method of generating a particle suitable for use as a porogen, which particle has a multi-armed core and surface decoration bonded to one or more arms of the multi-armed core. The surface decoration is generally selected from the group consisting of small molecules and oligomers having a degree of polymerization less than 50. The core may be hydrophobic or hydrophilic, and the surface decoration may likewise be hydrophobic or hydrophilic.

In order to be able to bond the surface decoration to the arms of the multi-armed core, it is desirable that those arms possess a surface functionality which makes it possible in reasonable yield to perform a suitable bonding reaction. Functionalities suitable for surface transformation include carboxylic acids and derivatives, nitriles, esters, isocyanates, alkyl halides, amides, sulfonic acids, phosphonates, thiols, thioesters, aldehydes, ketones, acetals, ketals, olefins, acetylenes, alcohols, and amines. Particularly preferred functionalities are hydroxy and amino substituents because of their easy accessibility and high reactivity in chemical transformations.

The multi-armed core of the invention may be hydrophobic or hydrophilic. If it is desired that the multi-armed core be hydrophobic, it can include for example polystyrene and related substituted derivatives, polynorbornenes and related polycyclic olefins, polyolefins, polysiloxanes, poly-acrylates, methacrylates, polyacrylonitriles, materials derived from the polymerization of vinyl derivatives substituted with electron deficient or donating substituents, and polyesters and polylactides derived by controlled ring opening of cyclic precursors. If it is desired that the multi-armed core be hydrophilic, it can include for example aliphatic polyethers, poly(vinylpyridines and substitutionally related derivatives, acrylates and methacrylates containing polar substituents), and polyacrylic acids generated from protected derivatives.

There are a large number of techniques which may be used to produce multi-armed cores possessing suitable functionality. Various types of polymerization chemistry have been reported as suitable, including anionic, controlled free radical, and controlled ring opening. It is preferable that the polymerization be living or at least controlled and that reactive functionality be retained and/or introduced on the periphery. Extensive crosslinking is preferably avoided and, if present, is preferably localized to a small central core where it provides mainly a scaffold for generating multiple arm sites.

The molecular weight of the porogen preferably increases rapidly during the formation of the multi-armed core. Systematic but time-consuming procedures such as the generation-by-generation divergent growth characteristic of early dendritic syntheses are less preferred because they are both time and labor intensive and are less suitable for the production of large amounts of material. Convergent growth routes may also be overly time consuming for semiconductor dielectric application. Hyperbranched materials (commonly imperfect dendrimers) are also less preferred, although they are synthetically more accessible.

The multi-armed core preferably has a spatial diameter between 1 and 30 nm, with spatial diameters between 1 and 15 nm being preferred, and spatial diameters between 1 and 10 nm being most preferred.

A particularly preferred route to stars for the multi-armed core, utilizing anionic polymerization, is shown in FIG. 1. An alkyl lithium initiator with protected reactive functionality is used to perform anionic polymerization. In FIG. 1, the initiator is depicted as having hydroxy functionality protected by a t-butyl dimethyl silyl group, but it will be understood that other functionalities and protective chemistries may be employed. With such an initiator and a suitable monomer, for example styrene, in appropriate conditions, polymerization proceeds, producing living polymer chains with the protected functionality at one end. Addition of a multifunctional coupling agent, for example p-divinylbenzene, results in the formation of stars as the living chains react with two or more functionalities in the agent. In the specific embodiment of FIG. 1, living chains will tend to react with both vinyl groups on a single p-divinylbenzene, leading to the formation of stars. As a result of this process, multi-armed hydrophobic cores are generated readily in a controllable fashion. Further details of a specific preferred embodiment are given in Example 1 below.

While the polymerizing monomer depicted in FIG. 1 is styrene, the polymerizing monomer could be any other monomer which can be polymerized anionically in a living manner. The reactive functionality could be present in masked form in the initiator, or alternatively it could be introduced during the quenching process. A variety of multifunctional moieties could be used to bring living chains together to form stars. The multifunctional reagents available include 1,2-divinyl benzene:

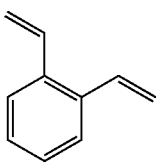

1,3-divinyl benzene:

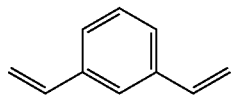

diisopropenylbenzene:

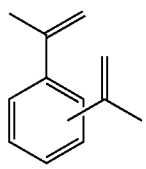

2-methacrylic acid 2-(2-methyl-acryloyloxy)-ethyl ester:

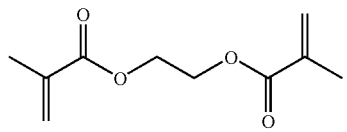

and 2-methacrylic acid 2-(2-methyl-acryloyloxy)-2-(3-methyl-2-oxo-but-3-enyloxy)-ethyl ester:

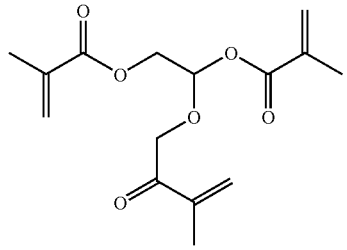 [SMILES: C=C(C)C(=O)COC(COC(=O)C(=C)C)OC(=O)C(=C)C]

If the procedure depicted in FIG. 1 is quenched following addition of p-divinylbenzene, the result is a multi-armed derivative which is referred to as a half star. Alternatively, however, the living anionic core can be expanded to a full star with roughly twice the number of arms by adding more of the original monomer or in some cases another polymerizable monomer. Adding more of the original monomer yields a multi-armed star homopolymer, while adding another polymerizable monomer would lead to a mixed or multi-armed star block copolymer.

Quenching the second polymerization with a reactive end cap such as ethylene oxide could result in hydroxyethyl functionality being incorporated into the second group of polymerizable arms. Various sequences could lead to chain terminating reactive functionality solely on the initiating arms, solely on the secondary arms, or contained on all polymer arms.

Using the procedure depicted in FIG. 1, the size of the star is controlled by the degrees of polymerization in the primary and secondary arms and the degree of branching in the core. The latter is controlled by the stoichiometry of the reagents.

Figure 2:
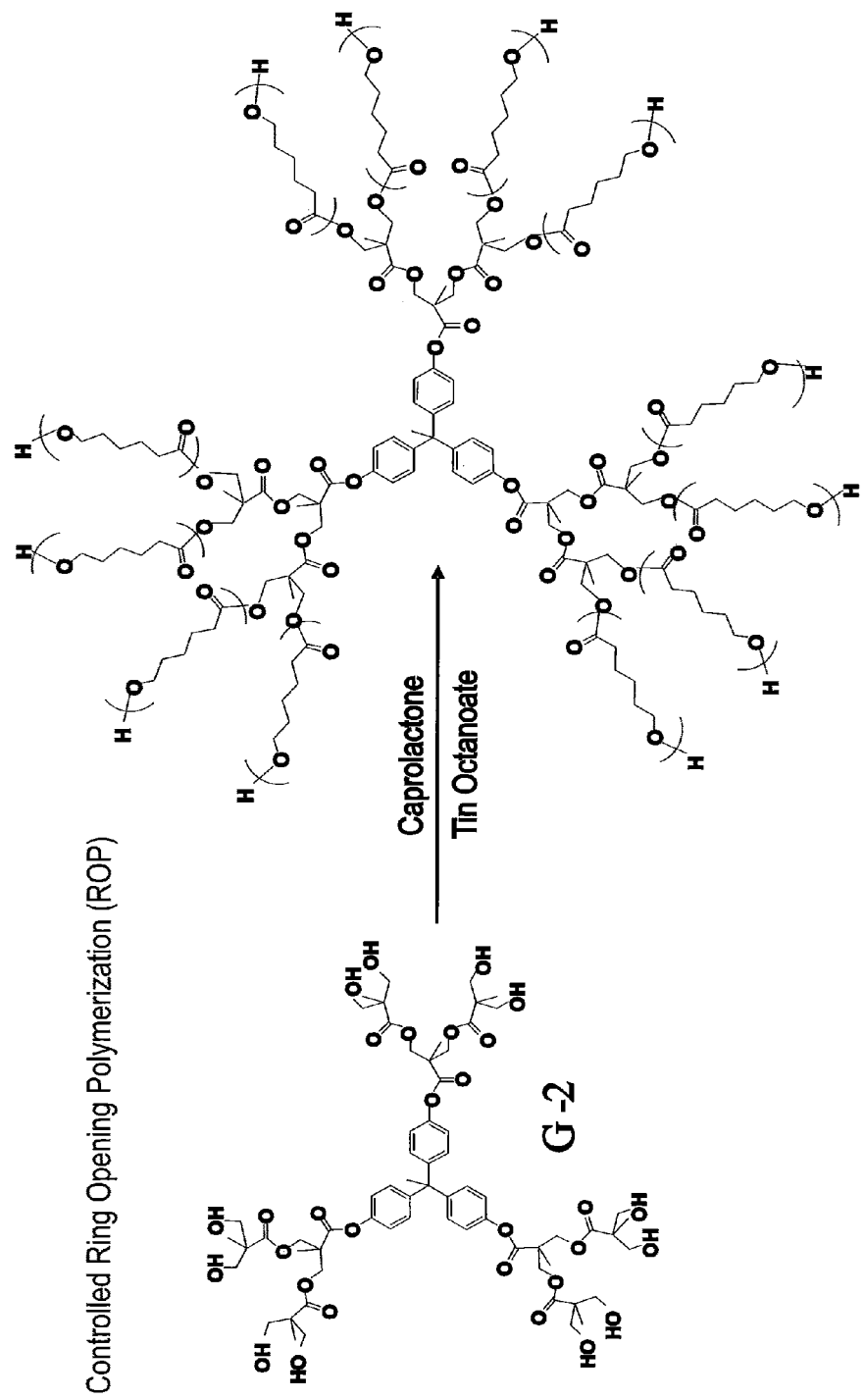
FIG. 2 depicts a route for the formation of functionalized multi-armed cores by ring opening polymerization of caprolactone.

An alternate method for producing multi-armed cores is the so called "core-out" route. An example of a multi-armed star polymer prepared by the core-out route utilizing ROP techniques is shown in FIG. 2. Here a multi-arm, hydroxylated initiator is generated using dendritic building blocks derived from bis-hydroxymethyl propionic acid (bis-MPA),

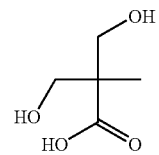

as described in the literature. See in this regard M. Trollsås & J. L. Hedrick, *J. Am. Chem. Soc.* 1998, 120, 4644. The initiator shown in FIG. 2 has 12 hydroxyl units available for initiation. By varying the functionality of the core and the generation of the dendritic hydroxylic subunit, initiators with varying hydroxy functionality (e.g., 2, 4, 8, 12, 24 arms) can be produced. These initiators can be used to polymerize caprolactone and related lactones and lactides in a controlled fashion using tin dioctanoate as described in Example 4 below. When such polymerization occurs, each arm is terminated with hydroxy functionality as shown in FIG. 2. Other catalysts are available for controlled ROP. See in this regard G. W. Nyce, T. Glauser, E. F. Connor, A. Mock, R. M. Waymouth & J. L. Hedrick, *J. Am. Chem. Soc.* 2003, 125, 3046-3056.

Another technique suitable for the production of multi-armed cores is atom transfer radical polymerization (ATRP) using multifunctional initiators. See in this regard S. Angot et al., *Macromolecules* 1998, 31, 7218; J. Ueda et al., *Macromolecules* 1998, 31, 6762. Amphiphilic materials have been produced by this technique. A. Heise et al., *Macromolecules,* 2000, 33, 2346; R. Francis et al., *Macromolecules,* 2003, 36, 8253. The initiators for ATRP can be a variety of alpha haloesters or benzyl halides. When ATRP is used to form the multi-armed core, the chain terminating functionality is preferably an activated alkyl halide which can subsequently be transformed.

Each of the preferred techniques described above produces a multi-armed star polymer with reactive chain ends using a single controlled polymerization step. The hydrodynamic size of the star particle depends on the polymer molecular weight which in turn is related to the number and length of the polymer arms. The cores prepared with these procedures are preferably hydrophobic but may be hydrophilic.

As noted above, a further aspect of the invention is the addition of surface decoration to the multi-armed core. The surface decoration may contain a wide variety of small molecules or oligomers. Preferably the surface decoration added to each arm contains an oligomer whose degree of polymerization is 50 or less, preferably 20 or less. The surface decoration for porogen use may be chosen to be compatible with the polymer matrix in which pores are sought to be generated. Commonly this preference for compatibility will result in the porogen being amphiphilic, most commonly with a non-polar core and polar surface decoration. A useful class of surface decorations contains oligomers of polyethylene glycol or polypropylene glycol. For the production of porogens of a desirable size for dielectric applications, the degree of oligomerization of the PEG oligomers preferably varies from 2-24. An advantage of adding surface decoration comprising PEG oligomers is that it permits one to fine tune the compatibility of the porogens with the matrix materials by suitably selecting structure and molecular weight.

As with the formation of the multi-armed core, the addition of surface decoration may proceed by a wide variety of routes. An approach to this process is to provide the surface decoration with a functional group which will react at a reasonable rate with the functionality of the arms of the multi-armed core, under reaction conditions which avoid reaction of that functionality with other portions of the surface decoration and avoid other undesired reactions generally.

As noted in the Background section above, a known prior art technique to add coronas to multi-armed cores, resulting in polymeric unimolecular amphiphiles, is successive tandem polymerization. This technique has drawbacks, as discussed above.

The generation of coronas for smaller-sized pores preferably uses simplified synthetic procedures which are amenable to scale-up and purification and that do not greatly increase the overall hydrodynamic size of the particle beyond the size of the multi-armed core. In addition, finer control of the corona layer is desired than is provided by successive tandem polymerization.

Preferable techniques for corona production employ a single moiety which, in a coupling reaction, produces the surface decorated porogen from the multi-armed core, for example by a substitution reaction. Such techniques will vary according to the reactive functionality which the multi-armed core possesses. If an advantageous coupling reaction for surface decoration is found suitable for a particular reactive functionality, it may be possible to proceed by converting other reactive functionalities through well-known synthetic reactions to the reactive functionality which works well with the coupling reaction. For example, hydroxy chain ends can be transformed into amines by activation and displacement with phthalimide anion or metal azides and further transformation. Subsequent treatment with hydrazine or reduction produces amino-functionalized stars.

When the reactive functionality in the multi-armed cores is hydroxy, surface decoration may be carried out through a variety of coupling reactions. The hydroxy units can be used as nucleophiles directly or converted to alkoxy anions using strong bases to increase the reactivity. In each case, the hydroxy functionality is transformed by the addition of reactive electrophiles. In this manner, the hydroxy functionalized star may be activated, for example, with potassium hydride in THF, and quenched with polar electrophiles.

Particularly preferred quenching electrophiles are the tosylate, mesylate, or triflate derivatives of mono methyl polyethylene glycol (PEG) oligomers. Useful PEG alcohols are available from Shearwater Inc. (now a part of Nektar Therapeutics, Huntsville, Ala.). The result of quenching with the preferred quenching electrophiles, as applied to the preferred stars of FIG. 1, is an amphiphilic particle with a polystyrene core and a PEG periphery. The PEG content can be varied based, for example, on the weight of the core and the nature of the dispersing medium with which compatibility is desired. The hydrophilicity of the surface decoration may be modified by co-reaction of the functionalized PEGs in the presence of a hydrophobic alkyl halide. The hydrodynamic diameter of the materials prepared in this manner varies from <5 nm to around 10 nm as determined by dynamic light scattering (DLS). When discussing hydrodynamic diameters, it should be noted that that the size measured in a good solvent is larger than the dry size, sometimes substantially (2-3×).

The particle sizes of the surface decorated anionic half-stars are substantially less than those of particles prepared by tandem polymerization (e.g., anionic followed by ATRP with PEG methacrylate). Tandem polymerization generates amphiphilic nanoparticles which are typically 1.3-10× larger.

Table 2 below gives examples of the difference between surface decorated and tandem polymerization nanoparticles.

|  | PS-PEGM | PS-LPEG |
| --- | --- | --- |
| # Arms | 22 | 24 |
| Calculated "Dry" Diameter | 8.7 nm | 6.8 nm |
| Mw (light scattering) | 216 K | 93 K |
| Diameter (light scattering) | 14 nm | 8.4 |
| m, n | m = 10, n = 7 | n = 16 |

Here PS-PEGM denotes nanoparticles with arms of the following form (PS=polystyrene), prepared by tandem polymerization.

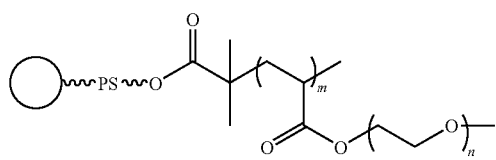

PS-LPEG denotes nanoparticles with linear arms of the form:

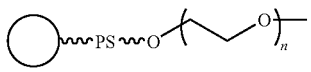

Other coupling reactions are also usable in the methods of the invention. For example, reaction of alcohols (e.g., PEG alcohols) with cyclic anhydrides (e.g. succinic, glutaric, adipic) results in moieties with carboxylic end groups. An example is the following reaction with 3-oxaglutaric anhydride:

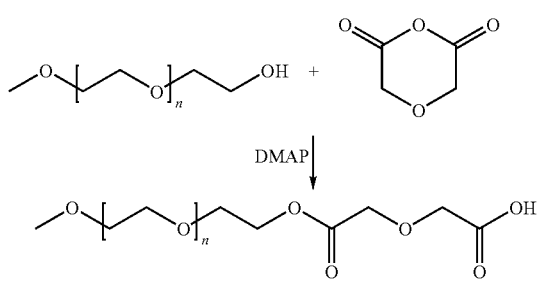

DMAP refers to dimethylamino pyridine.

Figure 3:
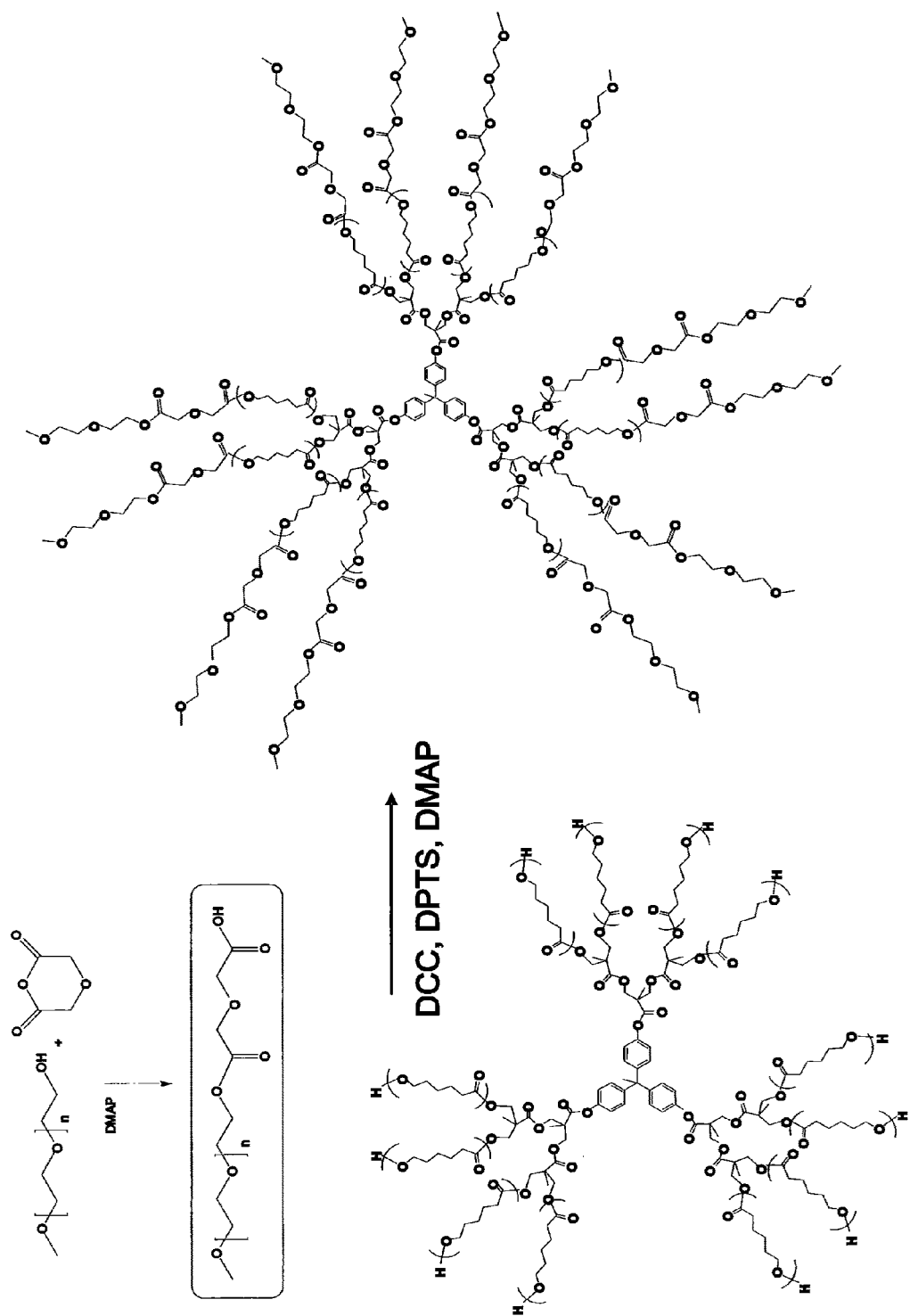
FIG. 3 depicts the coupling of PEG surface decoration to a functionalized multi-armed core by esterification.

By esterification with suitable dehydrating agents (e.g., dicyclohexylcarbodiimide (DCC)) these moieties will transform the hydroxy functionalities on the multi-armed core and so provide surface decoration, as depicted in FIG. 3. Other aliphatic anhydrides besides 3-oxaglutaric anhydride are also suitable for use in the process of adding surface decoration.

Dendritic branched star polymeric amphiphiles prepared in this fashion have hydrodynamic diameters ranging from 2-15 nm depending on the degree of polymerization in the core and the PEG unit. Again these particles are smaller (Dh=10-40 nm) than those prepared by tandem routes using functionalized caprolactone stars and PEG methacrylate (Mw=400).

Figure 4:
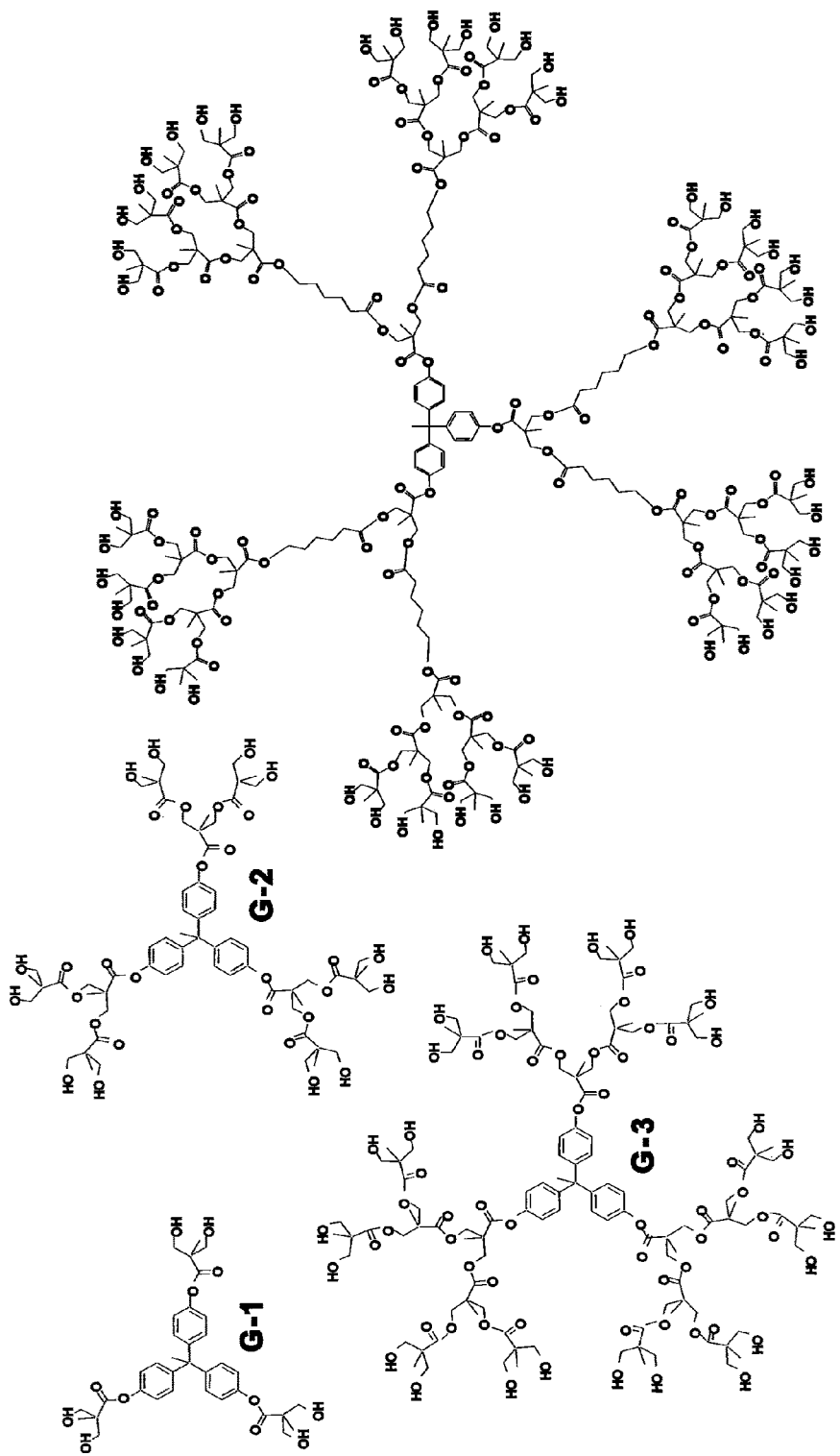
FIG. 4 depicts three examples of bis-MPA dendrimers, of generations 1, 2, and 3, and the result of addition of a cyclic anhydride to ester linkages in the generation 3 dendrimer, which extends each arm.

As a further alternative, as depicted in FIG. 4, condensation reactions with bis-MPA dendritic generations where the hydroxy groups are protected may lead to the formation of ester linkages from which the pendant alcohols may be liberated by acid hydrolysis or hydrogenolysis. Since each original hydroxyl group is converted into two or more by this procedure, the transformation represents a procedure for amplifying the number of chain ends.

Figure 5:
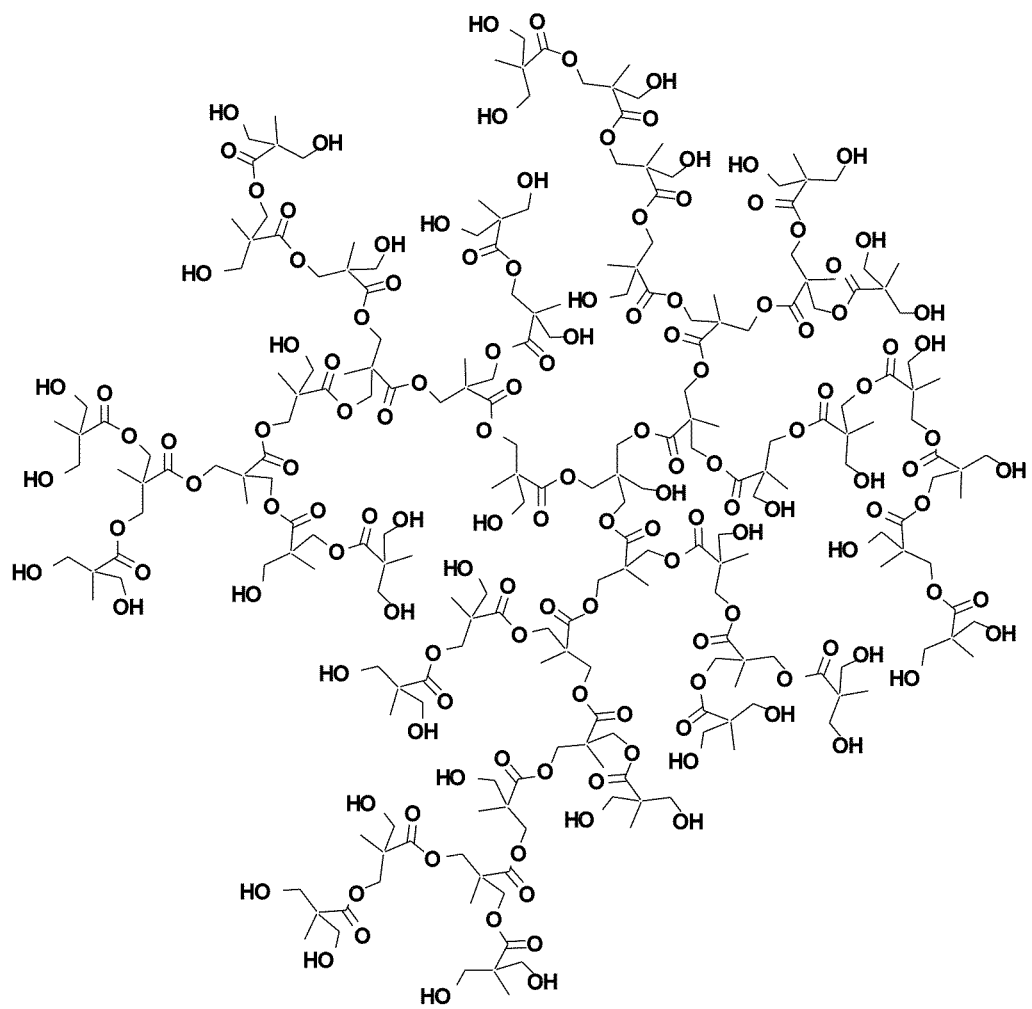
FIG. 5 depicts a hyperbranched polyester.

A further class of preferred surface decoration coupling reactions is as follows. FIG. 5 depicts an imperfect fourth generation hyperbranched polyester derived from pentaerythritol

Figure 6:
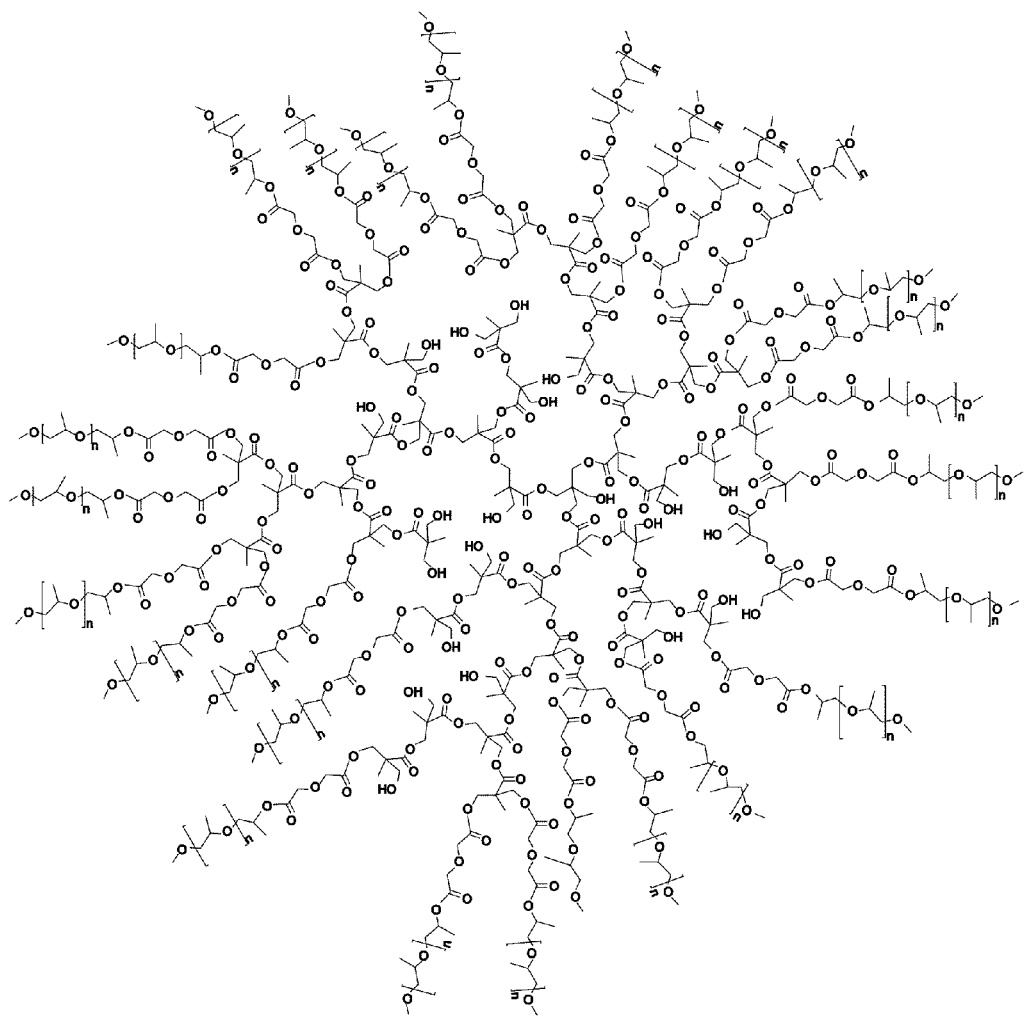
FIG. 6 depicts the result of decorating the hyperbranched polyester of FIG. 5 with PEG.

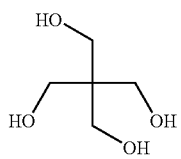

and bis-MPA. This hyperbranched polyester is commercially available from Perstorp Corp. (Perstorp, Sweden). This intrinsically hydrophobic core can be amphiphilically modified with a polypropylene glycol oligomer as shown in FIG. 6, via an esterification reaction like that shown in FIG. 3. The amphiphilic modification is helpful in making the resulting porogen compatible in polar silsesquioxane prepolymers. Note that in the hyperbranched polymer only some of the outer hydroxyl groups undergo esterification.

A further aspect of this invention is the use of the types of surface-decorated porogens described above to make porous dielectrics. Such dielectrics preferably have a dielectric constant which is below 3.0, more preferably below 2.5, and still more preferably below 2.0. Such dielectrics preferably have a porosity which is adjustable according to the amount of porogen admixed with matrix-forming precursors.

A porous dielectric manufacturing method of the invention comprises the steps of mixing a quantity of surface decorated amphiphilic nanoparticles with a matrix-forming substance or a precursor thereof, processing the resulting mix so as to form a dielectric matrix, and removing the nanoparticles, for example by heating.

A wide variety of matrix-forming (thermosetting) substances are known which are suitable for use in integrated circuit manufacturing. A large number of examples are recited in U.S. Pat. No. 6,399,666. A preferred class of matrix forming substances includes polymeric compounds comprising silicon, carbon, oxygen and hydrogen atoms. For example, thermosetting organosilicates and other organic thermosetting polymers could be used. Suitable inorganic compounds include (i) silsesquioxanes, (ii) alkoxy silanes, preferably partially condensed alkoxysilanes (e.g., partially condensed by controlled hydrolysis of tetraethoxysilane having an $M_n$ of about 500 to 20,000), (iii) organically modified silicates having the composition $RSiO_3$ and $R_2SiO_2$ wherein R is an organic substituent, and (iv) orthosilicates, preferably partially condensed orthosilicates having the composition $Si(OR)_4$.

The processing of the mix of matrix-forming substance and porogen will depend to some extent on which matrix forming precursor is used and also on what temperature is needed to remove the porogen. Commonly the processing will consist of a prescribed course of heating. Example 7 below recites specific preferred processing for silsesquioxane (SSQ) derivatives $(RSiO_{1.5})_n$.

A further embodiment of this invention is the manufacture of an integrated circuit comprising a porous dielectric made by the use of surface-decorated porogens. In general, the integrated circuit manufacturing method of the invention comprises the steps of forming transistors on a semiconductor substrate, forming one or more dielectric layers through the use of surface-decorated porogens, forming interconnect layers, dicing the semiconductor substrate, and packaging the resulting dies. In this method, it is understood that not all dielectric layers in the integrated circuit need be formed with surface-decorated porogens. Furthermore, the manufacture of dielectric and interconnect layers may be interleaved. For example, the porogens may only be eliminated from the dielectric layers after interconnect layers have been formed, as discussed for example in United States Patent Application Publication No. 2004/0130027 to Chen et al.

Figure 12:
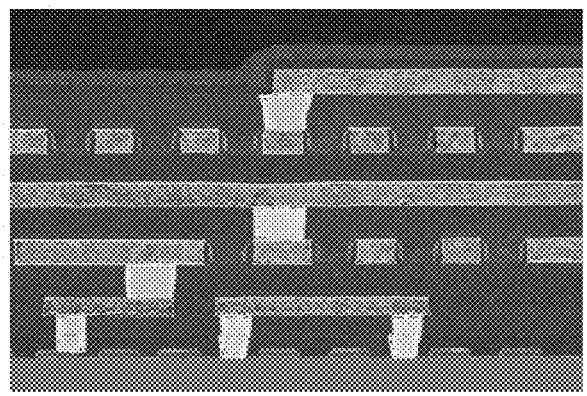
FIG. 12 depicts two cross sections through a multilayer integrated circuit comprising a nanoporous dielectric. In this case, the porous dielectric is comprised of an organic polymer.
Figure 12:
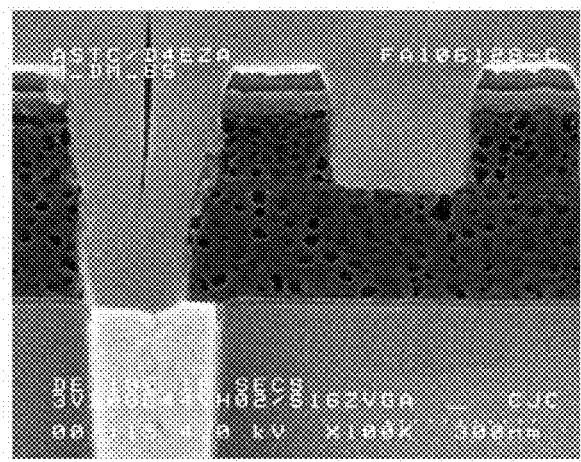

In further detail, a process of integrated circuit manufacture according to the invention may comprise, for example, the following steps. Following the formation of transistors and other devices in the semiconductor surface according to well known techniques, a mix of matrix precursor material and porogens may be spin coated upon the semiconductor. After spin-coating, the substrate is processed, for example thermally, in order to harden the matrix-forming material. The resulting dielectric is coated with photoresist, exposed, and patterned according to suitable masks. Space for lines, vias, and contacts is then etched in the dielectric using an etching chemistry or system which is compatible with the dielectric. The interconnects are then laid down in the space for the lines, vias, and contacts, for example in the form of a liner and/or barrier layer followed by a seed layer and a copper layer. The deposition of interconnect metal may employ suitable techniques such as electroplating, electrochemical deposition, chemical vapor deposition, or physical vapor deposition (PVD). These techniques may be employed in the context of a damascene process. The upper surface of the deposited interconnect and dielectric may then be subject to chemical-mechanical polish in order to flatten it. At some point, heating eliminates the porogens from the dielectric. Normally after the first dielectric and interconnect layers are placed on the substrate, a number of additional such dielectric and interconnect layers are placed on top of them. FIG. 12 depicts the dielectric and interconnect layers in an integrated circuit of a type in which the dielectrics of the invention would be used. Following the placement of all layers needed to interconnect the transistors and other devices initially formed to generate the type of integrated circuit desired, the substrate is optionally subjected to an electronic test suite and then diced into dies, which are bonded and packaged, being optionally subject to additional testing.

It is to be understood that while the invention has been described in conjunction with the preferred specific embodiments thereof, that the foregoing description as well as the examples that follow are intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties. However, where a patent or application containing express definitions is incorporated by reference, those express definitions should be understood to apply to the incorporated patent or patent application in which they are found, and not to the remainder of the text of this application, in particular the claims of this application.

Unless otherwise indicated, all reagents were obtained commercially or synthesized according to known methods.

EXAMPLES

In the examples, all solvents and styrene were distilled and degassed prior to use. p-Divinylbenzene was purified from commercial divinylbenzene (80% mixture of isomers) as described in the literature (R. H. Wiley, J. I. Jin, Y. Kamath, *J. Polym. Sci. A*-1, 1968, 6, 1065). The protected initiator, 3-t-butyldimethyl(silyloxy)-1-propyl lithium (TB-DMS-PL), was purchased from FMC Corp. Lithium Division. Precautions were taken to exclude air and moisture from reagents and reaction apparatus. All reagents and solvent transfers were done under inert atmosphere via glass syringes. Spectra Por 1 and Spectra Por 3 dialysis membranes with molecular weight cut offs ranging from 3,500 to 8,000 were used for removing the lower molecular weight fractions.

The 1,1,1-tris(p-hydroxyphenyl)ethane (THPE) (Hoechst Celanese) and stannous(II) 2-ethylhexanoate $Sn(Oct)_2$ (Sigma), were used as delivered. 4-(Dimethylamino)pyridinium 4-toluenesulfonate (DPTS) was synthesized according to a literature procedure. The $\epsilon$-caprolactone was dried over $CaH_2$ (Mallinckrodt), distilled and stored under $N_2$ prior to use. Toluene was dried over Na, distilled and stored under $N_2$. The methyl methacrylate and hydroxyethyl methacrylate (HEMA) were distilled under vacuum and refrigerated under $N_2$ until used. The dendrimers derived from 2,2-bis(hydroxymethyl)propionic acid (bis-MPA) were prepared according to a literature procedure. The benzyl 2,2'-bis(hydroxymethyl) propionate was synthesized according to a literature procedure. All other compounds were purchased from Aldrich and used as received.

Example 1

Anionic Star Polymerization with TDBMS-PL Initiator

To a vigorously dried 250 mL three neck flask, cyclohexane (170 mL), styrene (6 mL, 0.052 mol), and tetrahydrofuran (THF, 8 mL) were combined under argon. A 3-t-butyldimethyl(silyloxy)-1-propyl lithium (TBDMS-PL) initiator (1.46 mL, 0.47 M in cyclohexane) was added with efficient stirring. After stirring at room temperature for 30 minutes, an aliquot of the bright orange solution was withdrawn, precipitated into methanol under argon, isolated and saved for further analysis. p-Divinylbenzene (p-DVB, 0.25 mL, 1.70 mmol, p-DVB/LE ratio=1.4, LE=living polymer end) was added to the reaction to give a deep wine color solution. After 30 minutes, another aliquot was withdrawn, precipitated in methanol and saved for analysis. To the remaining "living core" polymer solution, styrene (4.0 mL, 35 mmol) was added in one portion. The final red-orange solution was stirred for 30 minutes and methanol (1.5 mL) was added to quench the polymerization. The colorless solution was slowly added to 1 L ethanol with vigorous mixing to give a white precipitate. After filtration and drying under vacuum the polymer product was isolated in quantitative yield.

Purification of polymer stars was performed by fractional precipitation; a 5 g portion of the polymer product was dissolved in dichloromethane (50 mL), acetone (150 mL), and IPA (isopropyl alcohol) was slowly added with efficient stirring until the solution became completely cloudy. This mixture was allowed to stand until the supernatant cleared and an oil settled out of the solution. The supernatant was decanted off into another flask where more IPA was added with stirring until the solution was cloudy again. After settling and decanting, this fractionation process was repeated until most of the product settled out and separated. All the fractions were analyzed by gel permeation chromatography (GPC) and products with similar molecular weights were combined in dichloromethane and precipitated out of methanol. This reverse precipitation method was very effective in the isolation of higher molecular weight star product from minor contaminants of lower molecular weight "half stars" and linear arms.

The controllability achieved by the method of this example is shown by the following tables.

| "Full" star | $M_n$ GPC | PDI | $M_n$, static light scattering | PDI | nm diameter, dynamic light scattering |
|---|---|---|---|---|---|
| Protected PS-Star | 99K | 1.11 | 268K | 1.06 | 15.5 nm |
| Hydroxy PS-Star | 80K | 1.05 | 265K | 1.06 | 15.8 nm |

The number of arms is determined to be 44, of which 22 are functional (6.6 K PS) and 22 are non-functional (5.5 K PS).

| "Half" star | $M_n$ GPC | PDI | $M_n$, static light scattering | PDI | nm diameter, dynamic light scattering |
|---|---|---|---|---|---|
| Protected PS-Star | 48K | 1.08 | 105K | 1.11 | 10.6 nm |
| Hydroxy PS-Star | 43K | 1.08 | 104K | 1.11 | 10.4 nm |

The number of arms is determined to be 30. The 30 arms are functional, with 3.5 K PS.

Example 2

Half-Star Polymerization with TDBMS-PL Initiator

The procedure described in example 1 was used except that the polymerization was quenched with methanol at the "living core" stage without the final styrene addition. Quantitative yield of polymer product was obtained from precipitation from methanol.

Example 3

Formation of Hydroxy Terminated Star Polymer

Tetrabutylammonium fluoride (1M in THF) was slowly added to a 5 wt % solution of the protected star polymer of example 1 in THF. After stirring at room temperature for 14 h, the solution was precipitated into methanol to give the hydroxy terminated star polymer. Multiple precipitations from methanol gave pure polymer product.

Example 4

Caprolactone Polymerization to Produce Star Polymers

The initiator, a first or second generation dendrimer derived from bis-MPA, prepared according to literature procedures (M. Trollsås & J. L. Hedrick, *J. Am. Chem. Soc.* 1998, 120, 4644), was distilled and stored in a glove box until used. The initiator and monomer were charged into a flamed flask and dissolved in 2 mL of toluene. The temperature was increased to 110° C. and tin dioctanoate was added. The polymerization was continued for 24 hours. The viscous solution was diluted with THF and precipitated in cold methanol. The bis-MPA units provide sensitive markers for the spectroscopic analysis of the polymers, as the quaternary carbon is sensitive to the substitution of the neighboring hydroxyl groups, and examination of the $^{13}$C NMR spectra demonstrated that initiation occurred from each of the hydroxyl groups of the dendritic initiator (i.e., quantitative initiation giving precise arm number). The polymer was isolated in nearly quantitative yield. The $^1$H NMR (CDCl$_3$) spectrum is as follows: δ 7.23-7.31 (m, 5H, -Ph), 4.6 (s, 2H, —OCH$_2$Ph), 4.14 (m, 2H, —CO$_2$CH$_2$—), 3.51-3.55 (m, 1H, CH—O), 2.23-2.27 (m, 2H, —CH$_2$CO$_2$—), 1.78-1.96 (m, 4H, —CH$_2$CHCH$_2$—). $^1$H NMR spectra were recorded in a solution with a Bruker AM 250 (250 MHz) spectrometer. $^{13}$C NMR spectra were recorded at 62.9 MHz on a Bruker AM 250 spectrometer using the solvent carbon signal as an internal standard.

Example 5

Preparation of Peg Methacrylate Core-Shell Particles

To a solution of hydroxy terminated star polymer (2 g) of example 3 dissolved in dichloromethane (20 mL), triethylamine (0.4 mL), and dimethylamino pyridine (68 mg), bromoisobutyryl bromide (64 mg) in dichloromethane (2 mL) was slowly added at room temperature. The mixture was stirred for 30 min, then heated to a gentle reflux for 2 h, followed by precipitating into methanol. Pure polymer was isolated after multiple precipitations from methanol. The polymer serves as a functionalized macro initiator.

A solution containing the above macro initiator (0.2 g), poly(ethylene glycol) monomethyl ether monomethacrylate (0.64 g, 1.6 mmole) and toluene (3.36 mL) was de-gassed in a Schlenk flask by repeated freeze-thaw cycle. On the last freeze cycle dibromo-bis(triphenylphosphino) nickel(II) (24 mg, 0.03 mmole) was added under argon and degassed for a final time. The homogeneous green solution was stirred at 90° C. for 15 h. Crude polymer was precipitated from hexane and residual Ni was removed by passing a solution of the product in dichloromethane through neutral alumina. A tacky colorless solid was isolated by reprecipitation from hexane. Further purification was performed by using a dialysis membrane with appropriate molecular weight cut off in water, methanol and dichloromethane.

Example 6

Preparation of Polystyrene Linear Peg Core-Shell Particles

A solution of hydroxy terminated star in THF was added to a stirring suspension of potassium hydride (5 fold excess) in THF at 0° C. The mixture was warmed to room temperature and stirred at 50° C. for 2 h. A THF solution of PEG-tosylate was added slowly at 0° C., stirred at room temperature for 2 h and at 70° C. for 4 h. (Regarding PEG-tosylate see H. D. Bijsterbosch et al., *Macromolecules*, 1998, 31, 7436.) Cold methanol was added to decompose the excess potassium hydride and the product was purified using dialysis in water, methanol, and dichloromethane.

Example 7

Generation of Dielectrics Using Porogens

Samples for dielectric studies were made by dissolving silsesquioxane (SSQ) derivatives (RSiO$_{1.5}$)$_n$ in an appropriate spinning solvent (e.g., propylene glycol methyl ether acetate (PM-acetate), propylene glycol methyl ether (PM-alcohol), propylene glycol propyl ether) at solid loading levels ranging from 20-30 wt. %. Templating porogens of prior examples were added to the SSQ solutions in concentrations ranging from 20-50 wt. % and films were spun at 2000-3000 RPM. The samples were heated to 80° C. for 15 minutes to remove solvent, then ramped to 450° C. at 2 degrees/minute. Upon reaching the maximum temperature, the wafers were held isothermally at this temperature for 2 hrs. At this point, the films were clear regardless of the porogen loading level and the refractive index measured was inversely related to the porogen load. For comparison, dielectric solutions were also prepared using linear poly (propylene glycol) (12K) as an example of a typical efficient porogen functioning by a random N&G mechanism (miscible initially followed by phase separation upon matrix vitrification).

Example 8

Measurement of Dielectric Properties

Figure 7:
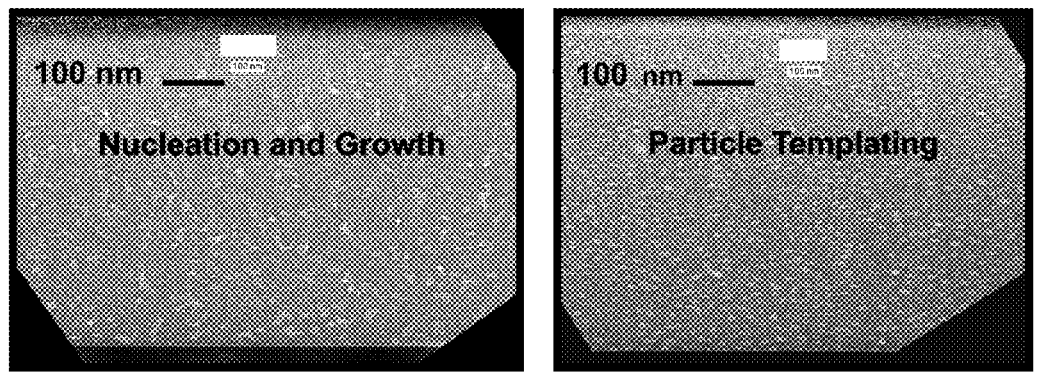
FIG. 7 shows TEM (transmission electron microscope) micrographs and SAXS (small angle X-ray scattering) data for dielectric films formed with nucleation and growth porogens (left) and with porogens of the invention (right). The films had 20% wt. porogen/MSSQ.
Figure 7:
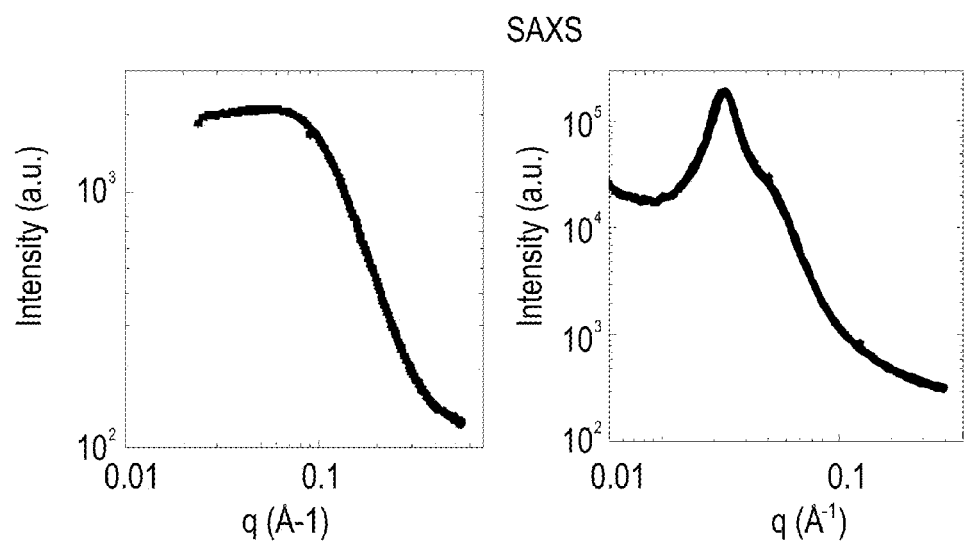

FIG. 7 shows TEM and SAXS (small angle X-ray scattering) data for the N&G porogens of example 7 on the left and for the templating porogens of example 7 on the right. It is seen that there is a large difference in film morphology between N&G porogens and templating particles.

Figure 8:
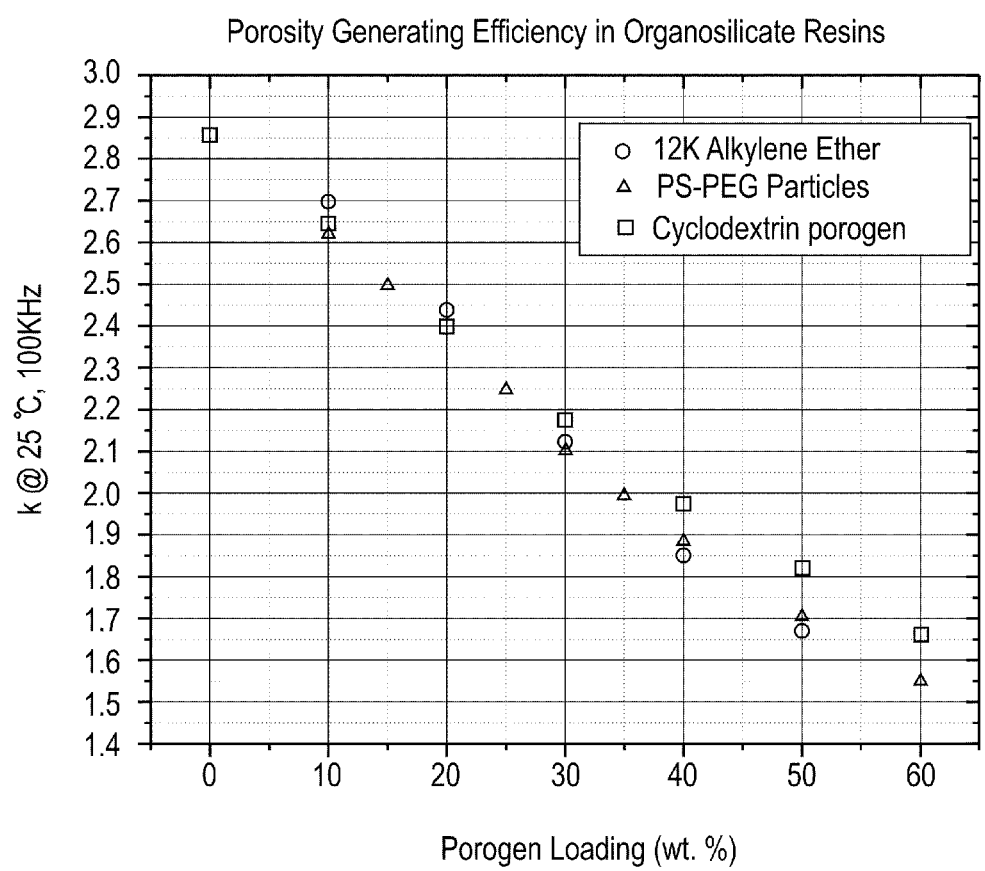
FIG. 8 shows the porosity generating efficiency in organosilicate resins of the porogens of the invention compared to certain prior art porogens.

FIG. 8 shows a plot of refractive index versus porogen loading level for the PEG linear porogen of example 6 above, compared with an amphiphilic particle prepared by tandem polymerization (polystyrene core prepared anionically and a PEG methacrylate corona (40 wt %) generated by ATRP) and an N&G porogen. The figure shows that the templating particles are at least as efficient at generating porosity as the most efficient N&G porogens, as determined by the slope and magnitude of the refractive index change as a function of porogen loading.

Note also in FIG. 8 that surface decorated porogen dielectric constants ranging from 1.5-2.6 were measured for porogen loading levels varying from 10-60 wt. %.

Figure 9:
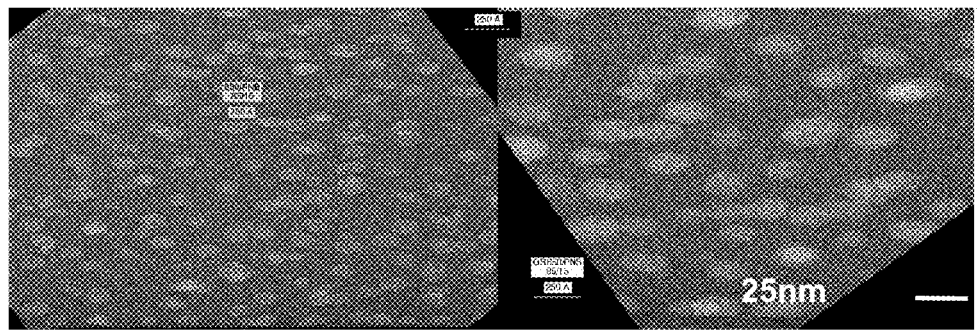
FIG. 9 depicts TEM micrographs and pore size distributions for dielectrics generated from two amphiphilic porogens A and B having $M_n$=140,000 and 400,000 respectively, prepared by tandem ring opening polymerization.
Figure 9:
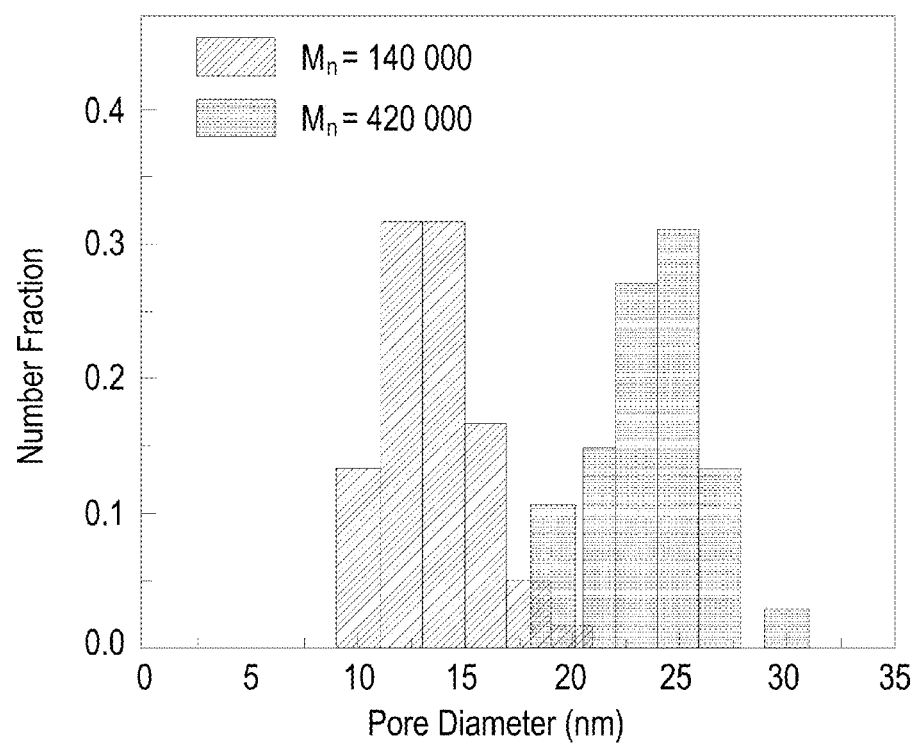

For comparison, FIG. 9 depicts TEM micrographs where the porogen was an amphiphilic particle prepared by tandem ring opening metathesis polymerization. The elliptical shape of the pores is an artifact of the focused ion beam (FIB) sample preparation. The concept of one particle yielding one pore is demonstrated in the figure. The pore sizes are comparable to the templating particle sizes. The figure also shows that tandem polymerization route tends to produce particles which are undesirably large for applications relating to advanced dielectrics for semiconductor processing.

Figure 10:
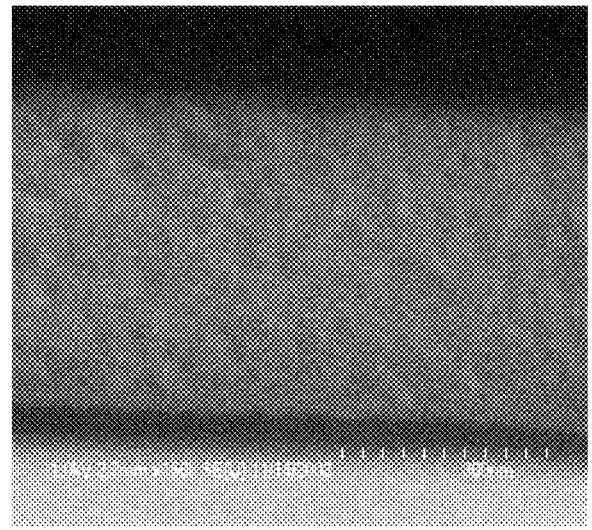
FIG. 10 depicts FE-SEM (field emission scanning electron microscope) and TEM micrographs of a porous film derived by mixing the porogen of example 6 (PS-LPEG with n=16, $M_w$=93K, solution diameter 10 nm, 24 arms, PS=2.7K).
Figure 10:
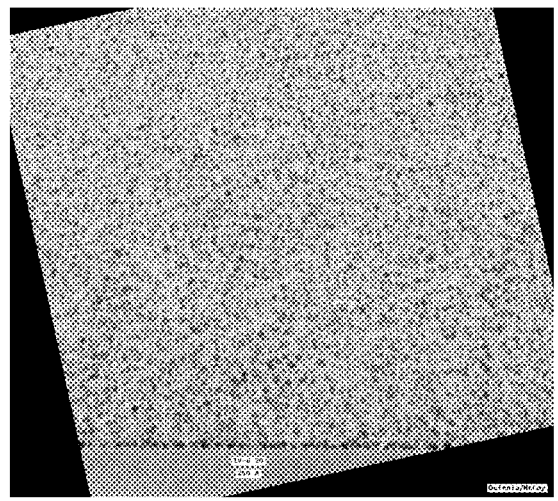

FIG. 10 shows both FE-SEM and TEM micrographs of a porous film derived by mixing the porogen of example 6 (MW=93K, 24 arms, solution diameter 10 nm, PEG degree of oligomerization=16) with a low molecular weight methyl silsesquioxane resin and processing as described above. Unlike the samples prepared using tandem polymerized porogen (shown for comparison), the pores generated from the surface decorated porogen were much smaller, reflecting the smaller size of the porogen particle.

Example 9

Surface Decoration Coupling with Anhydride Coupling Reagent

PEG oligomers were attached to a fourth generation dendrimer of the series shown in FIG. 4 following caprolactone polymerization as depicted in FIG. 2. PEG oligomers were also attached to a commercially available hyperbranched polyester star of the class depicted in FIG. 5, resulting in structures of the form shown in FIG. 6. The surface decoration was performed by means of an anhydride coupling reagent as depicted in FIG. 3.

Table 3 below shows the molecular characteristics of typical samples prepared from the star and hyperbranched (HB) materials using PEG oligomers.

| Sample entry | PCL architecture | PCL (DP) per arm | PEG $M_n$ g/mol | $M_n$ SEC | PDI |
|---|---|---|---|---|---|
| 1 | 24 arm star | 25 | 360 | 77000 | 1.20 |
| 2 | 24 arm star | 25 | 1200 | 68000 | 1.48 |
| 3 | 24 arm star | 25 | 520 | 74000 | 1.30 |
| 4 | 6 arm star | 10 | 360 | 20000 | 1.16 |
| 5 | 6 arm star/12 | 10 | 360 | 29000 | 1.09 |
| 6 | G-4 HB (64 arm) | — | 360 | 3500 | 1.03 |
| 7 | G-4 HB (64 arm) | — | 1200 | 3000 | 1.04 |
| 8 | G-4 HB (64 arm) | — | 2000 | 43000 | 1.31 |

In the above table, the notation "6 arm star/12" means a 6-arm ring-opening polymerization (ROP) initiator was used to polymerize caprolactone in a core-out procedure. The star polymer so generated had 6-hydroxy terminated polycaprolactone arms. The surface functionality could then be amplified by coupling the polymer with bis-MPA to yield a corona with 12 functionality (6×2 (bis-MPA)=12), hence the designation 6-arm star/12. This might be called a "second generation" dendrimer, although that terminology might be confusing because there is polycaprolactone (PCL) between the dendritic functionality.

Size-exclusion chromatography (SEC) was carried out on a Waters chromatograph connected to a Waters 410 differential refractometer. Four 5 μm Waters columns (300×7.7 mm) connected in series in order of increasing pore size (100, 1000, $10^5$, $10^6$ Å) were used with THF as eluant. The SEC results were calibrated with polystyrene standards.

Figure 11:
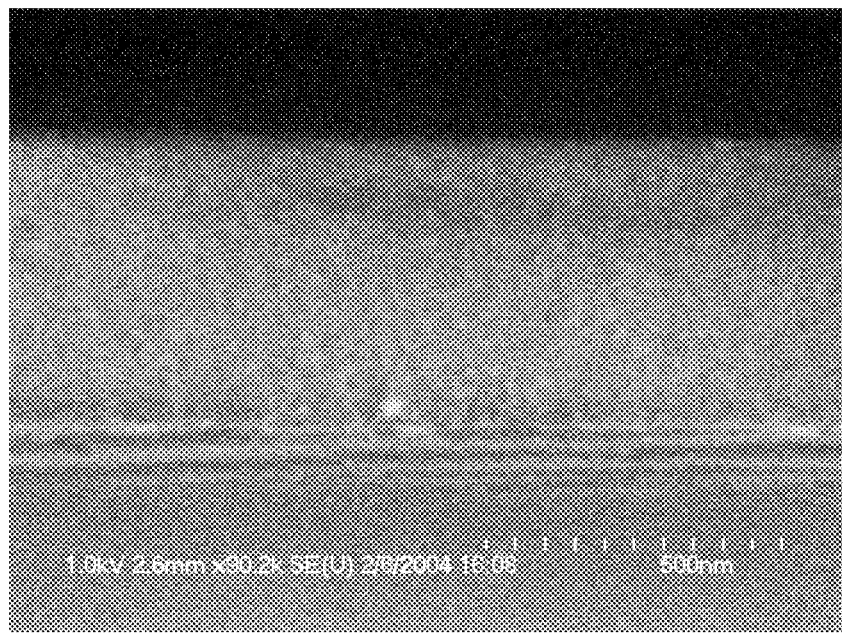
FIG. 11 shows FE-SEM and TEM micrographs of films formed using a porogen of the general structure depicted in FIG. 3.
Figure 11:
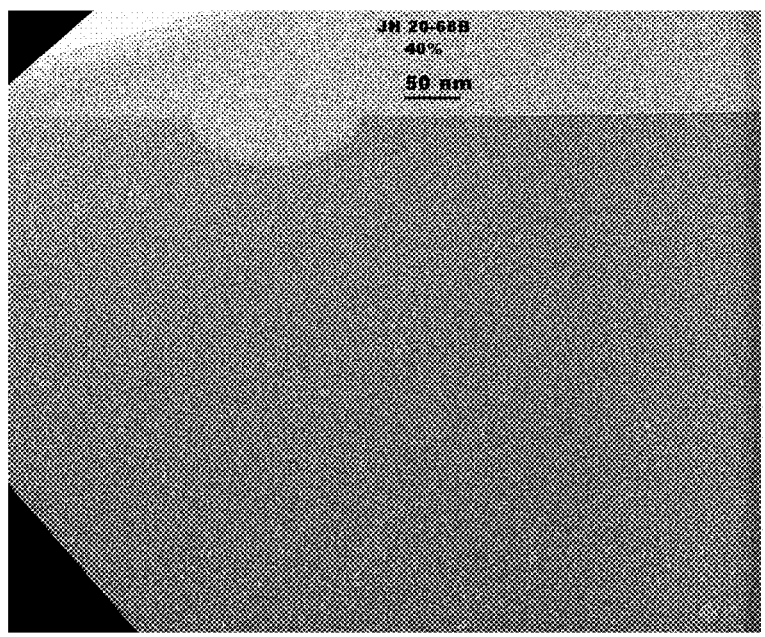

Again, as was observed for the anionic half-stars, the pores generated in MSSQ resins with the preceding polycaprolactone (PCL) stars were too small for visualization using either FE-SEM or TEM as shown in FIG. 11. The porogen loading in FIG. 11 was 40 wt % and the sample was entry 5 (6-arm star/12) from Table 3. In each case, we see that the porogen size for templating porogens can be effectively reduced by going to a surface decoration route rather than utilizing tandem polymerization.

We claim:

1. A unimolecular amphiphilic nanoparticle, comprising:
   a star polymer with a multi-armed core including at least 3 arms, wherein the multi-armed core comprises linear, dendritic, or hyperbranched aliphatic polyester segments; and
   surface decoration attached to said polyester segments, wherein the surface decoration is compatible with a matrix material, and wherein the surface decoration comprises polyethylene glycol or polypropylene glycol oligomers having a degree of polymerization less than 50.

2. The unimolecular amphiphilic nanoparticle of claim 1, wherein the matrix material is an organosilicate.

3. The unimolecular amphiphilic nanoparticle of claim 1, wherein the matrix material is a thermosetting organic polymer.

4. The unimolecular amphiphilic nanoparticle of claim 1, wherein at least one surface decoration unit is attached to each of a majority of said arms.

5. The unimolecular amphiphilic nanoparticle of claim 1, wherein the multi-armed core is hydrophobic.

6. The unimolecular amphiphilic nanoparticle of claim 1, wherein the star polymer is selected from the group consisting of a full star polymer and a half star polymer.

7. A method of using the unimolecular amphiphilic nanoparticle of claim 1 in a templating process to generate porous dielectrics having a dielectric constant less than 3.00, said method comprising:
(a) mixing a quantity of the unimolecular amphiphilic nanoparticles with an organosilicate matrix forming substance or a precursor thereof;
(b) processing the mix resulting from step (a) so as to form a dielectric matrix; and
(c) removing the nanoparticles.

8. The method of claim 7, wherein the dielectric generated by the process has a dielectric constant less than 2.5.

9. The method of claim 7, wherein the surface-decorated unimolecular amphiphilic nanoparticles have an average spatial diameter of between 1 and 15 nm.

10. The method of claim 9, wherein the surface-decorated unimolecular amphiphilic nanoparticles have an average spatial diameter of between 1 and 10 nm.

11. A method of making an integrated circuit using the unimolecular amphiphilic nanoparticle of claim 1 comprising:
(a) forming transistors on a semiconductor substrate,
(b) forming one or more dielectric layers through a templating process which employs a quantity of the unimolecular amphiphilic nanoparticles and an organosilicate matrix forming substance or a precursor thereof,
(c) forming interconnect for interconnecting said transistors,
(d) dicing the semiconductor substrate,
(e) packaging the dies.

12. The method of claim 11, wherein the one or more dielectric layers have a dielectric constant less than 2.5.

13. The method of claim 12, wherein the one or more dielectric layers have a dielectric constant less than 2.0.

14. A unimolecular amphiphilic nanoparticle, comprising:
(a) a star polymer with a multi-armed core comprising linear, dendritic, or hyperbranched aliphatic polyester segments; and
(b) surface decoration attached to said polyester segments, wherein the surface decoration is hydrophilic and is miscible in a matrix material and is selected from small molecules and oligomers having a degree of polymerization less than 20.

15. The unimolecular amphiphilic nanoparticle of claim 14, wherein the matrix material is an organosilicate.

16. The unimolecular amphiphilic nanoparticle of claim 14, wherein the surface decoration comprises polyethylene glycol or polypropylene glycol oligomers.

17. The unimolecular amphiphilic nanoparticle of claim 14, wherein at least one surface decoration unit is attached to each of a majority of said arms.

18. The unimolecular amphiphilic nanoparticle of claim 14, wherein the multi-armed core is hydrophobic.

19. The unimolecular amphiphilic nanoparticle of claim 14, wherein the star polymer is selected from the group consisting of a full star polymer and a half star polymer.

* * * * *